(12) United States Patent
Kirshenbaum

(10) Patent No.: US 8,627,111 B2
(45) Date of Patent: Jan. 7, 2014

(54) MANAGING ASSOCIATIONS BETWEEN KEYS AND VALUES

(75) Inventor: Evan R Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1159 days.

(21) Appl. No.: 12/243,903

(22) Filed: Oct. 1, 2008

(65) Prior Publication Data

US 2010/0083004 A1    Apr. 1, 2010

Related U.S. Application Data

(60) Provisional application No. 61/047,331, filed on Apr. 23, 2008.

(51) Int. Cl.
 *G06F 11/30*    (2006.01)
(52) U.S. Cl.
 USPC ......................................................... 713/193
(58) Field of Classification Search
 USPC ......................................................... 713/193
 See application file for complete search history.

(56) References Cited

U.S. PATENT DOCUMENTS

| | | | |
|---|---|---|---|
| 7,725,437 B2* | 5/2010 | Kirshenbaum et al. | 707/640 |
| 7,895,666 B1* | 2/2011 | Eshghi et al. | 726/30 |
| 2004/0107186 A1* | 6/2004 | Najork et al. | 707/3 |
| 2006/0106857 A1* | 5/2006 | Lillibridge et al. | 707/102 |
| 2007/0061311 A1* | 3/2007 | Kurose | 707/3 |
| 2007/0276843 A1* | 11/2007 | Lillibridge et al. | 707/100 |

OTHER PUBLICATIONS

S. Lyall, Cancel-Locks in Usenet Articles, May 1999,Usefor Working Group, pp. 1-5.*

* cited by examiner

*Primary Examiner* — Krista Zele
*Assistant Examiner* — Esther Benoit

(57) ABSTRACT

Provided are, among other things, systems, methods and techniques for managing associations between keys and values within a computer processing system. In one exemplary implementation, requests to store associations between keys and data values corresponding to the keys are input, and the associations are stored in entry nodes within a data structure represented as a hash-based directed acyclic graph (HDAG). Upon receipt of a data value request and accompanying request key, together with satisfaction of any additional access criterion, a return data value corresponding to the request key automatically is provided, the return data value having been generated based on at least one of the associations that involve the request key.

19 Claims, 10 Drawing Sheets

| algorithm | | values | Type |
|---|---|---|---|
| 00–17 | | 23 | standard |
| 18–1A | | 3 | private |
| 1B–1C | | 2 | internal |
| 1D | 442 | 1 | constant |
| 1E | 00–BF | 192 | standard |
| 1E | C0–DF | 32 | private |
| 1E | D0–FF | 32 | internal |
| 1F | 0000–BFFF | 49,152 | standard |
| 1F | C000–DFFF | 8,192 | private |
| 1F | E000–FFFF | 8,192 | internal |

420⟶ | 445⟶ 447⟶

| algorithm | | values | Type |
|---|---|---|---|
| 00–17 | | 23 | standard |
| 18–1A | | 3 | private |
| 1B–1C | | 2 | internal |
| 1D | | 1 | constant |
| 1E | 00–BF | 192 | standard |
| 1E | C0–DF | 32 | private |
| 1E | D0–FF | 32 | internal |
| 1F | 0000–BFFF | 49,152 | standard |
| 1F | C000–DFFF | 8,192 | private |
| 1F | E000–FFFF | 8,192 | internal |

FIG. 12

| scheme | A | L | length | algorithm |
|--------|---|---|--------|-----------|
| 00 | 0 | 0 | 0 | null |
| 01 | 0 | 1 | 16 | MD5 |
| 09 | 1 | 1 | 16 | map key |
| 02 | 0 | 2 | 20 | SHA-1 |

FIG. 13

MANAGING ASSOCIATIONS BETWEEN KEYS AND VALUES

CROSS REFERENCE TO RELATED APPLICATIONS

This Application claims the benefit of U.S. Provisional Application Ser. No. 61/047,331 filed Apr. 23, 2008, titled "Managing Associations Between Keys And Values" which is hereby incorporated by reference herein as if reproduced in full below.

FIELD OF THE INVENTION

The present invention generally pertains to systems, methods and techniques for managing associations between keys and values and can be used, e.g., for storing metadata about files and other data objects and/or for controlling access to decryption keys or other sensitive information.

BACKGROUND

There often arises a need to make information available, either to a general population of users or only to certain individuals. Moreover, it sometimes is desirable to make such information available on a secure basis. For example, one context in which this problem arises is the communication of decryption keys to the particular individuals who are authorized to view corresponding encrypted files, while at the same time taking appropriate measures in an attempt to preclude unauthorized individuals from obtaining such information. In fact, in such situations it often will be advantageous to preclude anyone from obtaining information that he or she does not absolutely require, including secondary information, such as who has been granted access rights to which files. Complicating this problem is the fact that both the information and the people who are supposed to have access to it sometimes change over time.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

FIG. 12 illustrates general meanings of different values for the algorithm type field of a scheme descriptor according to a representative embodiment of the invention; and FIG. 13 illustrates a sample set of initial scheme descriptor value assignments.

DESCRIPTION OF THE PREFERRED EMBODIMENT(S)

This disclosure is in some respects an extension of the disclosures set forth in U.S. patent application Ser. No. 11/149,509, filed Jun. 10, 2005, titled "Identifying Characteristics in Sets of Organized Items" and published as U.S. Patent Application Publication No. 20060282475 on Dec. 14, 2006, Ser. No. 11/514,634, filed Sep. 1, 2006, and titled, "Data Structure Representation Using Hash-Based Directed Acyclic Graphs and Related Method" (the '634 application), and Ser. No. 11/888,092, filed Jul. 31, 2007, and titled, "Storing Nodes Representing Respective Chunks of Files in a Data Store" (the '092 application), which applications are incorporated by reference herein as though set forth herein in full. The present disclosure also is related to the concurrently filed, commonly assigned patent applications by the present inventor titled "Decryption Key Management" (the "Key Management" application) and titled "Access Grants" (the "Access Grants" application), which applications also are incorporated by reference herein as though set forth herein in full.

The present invention addresses, among other things, the problem of how to distribute, or otherwise make available, various kinds of information. In certain embodiments, such information can be characterized as metadata that describe or otherwise pertain to particular data objects (e.g., arranged in a hierarchical data structure) containing substantive content. In other embodiments, the information comprises content that has independent value.

Figure 1:
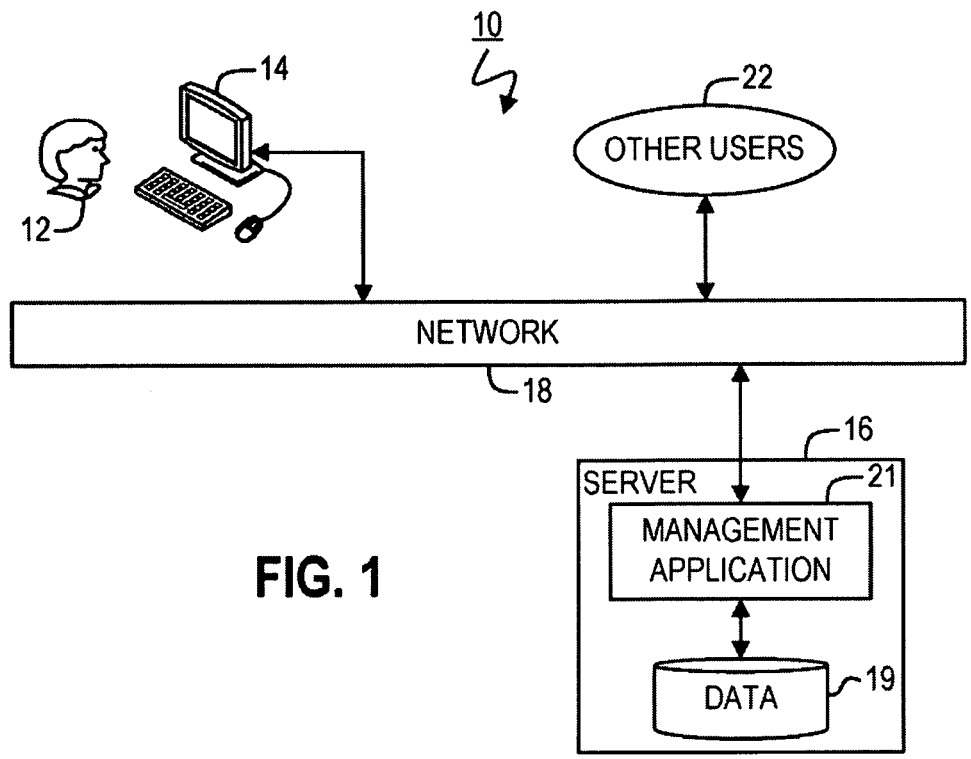
FIG. 1 is a block diagram illustrating a computer system within which certain embodiments of the present invention are implemented.

An example of one context in which certain aspects of the present invention may be utilized is system 10, illustrated in FIG. 1. As shown in system 10, a user 12 operating through a computer 14 accesses data in a server 16 (sometimes referred to herein as the data store) via network 18. At the same time, a number of other users 22 (e.g., tens, hundreds or thousands of other users) also are able to access server 16 via network 18. Although server 16 is shown as a single component, in certain embodiments it is comprised of multiple server boxes (e.g., collectively functioning as a single logical unit).

Within server 16 is a database 19, which includes stored associations between keys and values according to the present invention. Application 21 controls access to the data within database 19. Generally speaking, the data within server 16 can include any kind of values which one would like to make available, often to a large number of people.

In certain representative embodiments, server 16 corresponds, e.g., to the file server or to the backup server discussed in the "Key Management" application. In either such case, the data stored and retrieved according to the techniques described below can include decryption keys for encrypted files and/or any of a variety of different kinds of metadata pertaining to stored files or portions thereof. As noted in the "Key Management" application, data files and portions thereof can be stored in a data structure formatted as a hash-based directed acyclic graph (HDAG). In addition (or instead), as discussed below, associations between keys and values can be stored within an overall HDAG structure.

The most obvious approach to storing associations between keys and data values is to simply maintain a table mapping keys (e.g., keys known to certain authorized individuals) to corresponding data values. However, there are several problems with this approach:

First, anyone with permission to set a value would have permission, by doing so, to delete a value already in the map. This has serious implications in many situations (e.g., in the context of a decryption key store), as the key, which preferably is a hash or other function of a value that includes the grantee's identity and an identifier for the data object, can be computed by anyone knowing this information, and so anybody who knows both can assert a bogus key, rendering the data inaccessible to someone who was supposed to have been able to read it.

Second, anyone with permission to read a value can, by doing so, determine that a value has been set. In the context of a decryption key store, this means that even if someone cannot use the encryption key to decrypt the data, he or she can still gain information that a particular entity has been granted access to it.

Third, associations remain in the map until they are explicitly deleted. They would not be easily amenable to a desired "retention policy"-based automatic reclamation of the rest of the data store. This often would result in the metadata outliving the data it describes, even when not useful or desirable.

Fourth, such an approach would make it difficult to verify that a large number of associations that are supposed to be stored are, in fact, there. An easy way to verify existence of associations often is highly desirable.

Figure 2:
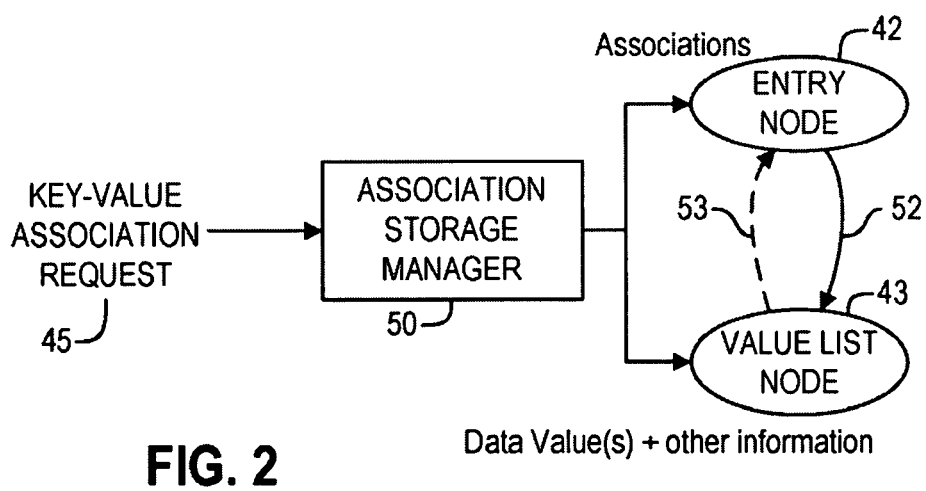
FIG. 2 is a block diagram illustrating storage of a key-value association.

In order to address the foregoing problems, the present invention provides systems that include request-management processes and techniques, as well as storage data structures. With regard to storage, as shown in FIG. 2, the preferred embodiments of the present invention employ a structure utilizing two kinds of storage nodes: entry nodes 42 that store associations that are requested (by authorized entities) to be made between keys and data values and value list nodes 43 that store the data values pertaining to a common key. Preferably, the entry nodes 42 reflect associations in the manner they are asserted and, therefore, correspond to the entities that are asserting the associations, while the value list nodes store information for responding to a retrieval request and, therefore, correspond to individual keys.

Upon receiving a request 45 to associate a key with a data value, storage manager 50 (e.g., a subcomponent of management application 21) preferably creates entry node 42 to store the association and simultaneously creates (or supplements) value list node 43 to reflect any impact the association has on future retrieval requests pertaining to the key. Additional detail regarding these aspects of the invention is discussed below.

Figure 3:
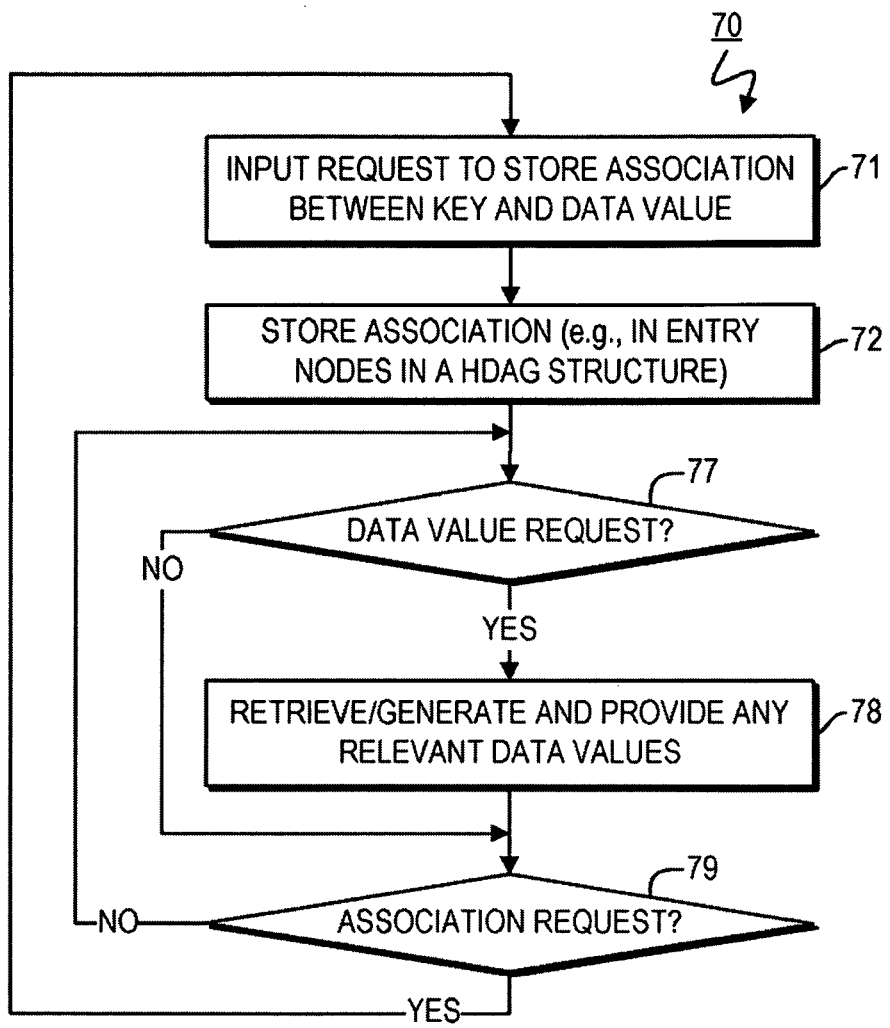
FIG. 3 is a flow diagram illustrating a process for managing storage of associations between keys and values, as well as retrieval of the stored values.

An exemplary process 70 that is implemented by management application 21 in certain embodiments of the invention is shown in FIG. 3. Preferably, process 70 is fully automated so that it can be performed using one or more computer processors to run computer-executable process steps stored on one or more computer-readable media, or in any of the other ways described herein. As indicated above, process 70 can be used, e.g., for the storage and retrieval of various kinds of sensitive and/or non-sensitive information.

Initially, in step 71 a request (e.g., request 45) to store an association between a key and a data value is received by storage manager subcomponent 50. It is noted that such a request can take different forms in different embodiments of the invention. For example, in one set of embodiments, the request includes an explicit call, e.g., of the form, "Please associate this value with this key," or "Please associate these values with these respective keys." In another set of embodiments, the request is generally of the form "Please store this entry node," which the data store 16 then recognizes by its form (e.g., by a "node type" indicator contained in it as containing associations that should be added to the system.

In one exemplary embodiment, the key corresponds to a particular user who is being granted access (i.e., the grantee) and also corresponds to a particular file, folder or other data object for which access is being granted (but instead could correspond to either one alone), and the data value corresponds to a decryption key that is used to decrypt the data object (or any other metadata pertaining to the data object). One such embodiment is described in more detail in the "Key Management" application.

More generally, however, the key can be (or include) any desired value, including hashes of chunks, arbitrary strings or hashes of arbitrary values. Often, the key will correspond in some manner to the type of data value with which it is associated. In one example, the key includes or is a function of information designating "weather—Los Angeles", and the data value includes component values for temperature, barometric pressure, wind speed, wind direction, etc.

In this regard, the term "data value" as used herein can comprise a single value (e.g., a decryption key as described in the "Key Management" application) or an array or set of component values of the same or different types (e.g., an entire set of values for entry into the fields of a pre-defined form). Generally speaking, the request 45 can involve any kind of data value.

In addition to the key and data value, the request 45 frequently will include other kinds of information as well, such as override information and/or access control information. In any event, the request 45 preferably can be initiated by a user 12, either directly or, e.g., indirectly by the user 12 assigning association-assertion rights to another entity through a user interface running on her computer 14.

In step 72, the association in request 45 is stored. One aspect of the preferred embodiments of the present invention is the decoupling of defined associations from the data value(s) that are returned in response to a query. In order to achieve such decoupling, as previously noted, in the embodiment shown in FIG. 2 the storage manager 50 uses two different kinds of storage nodes: an entry node 42, e.g., which includes keys and other information pertaining one or more defined associations which are desired to be managed together, and a value list node 43, e.g. which includes the data values and other information pertaining to a particular key.

Ordinarily, the entry node 42 is newly generated for each new key-value association request 45 (storing all key-value associations asserted in one request), while the value list node 43 preferably is identical across all associations involving the same key. Therefore, the value list node 43 either is newly generated (if no previous association with the same key has been stored) or is simply accessed and the new information added to it (if such a previous association has been stored). In some embodiments, there is more than one value list node 43 corresponding to a single key for purposes of federation, performance, or fault tolerance. In an exemplary embodiment of a system in which assertions of associations are more frequent than lookups, a second, temporary value list node reflecting recent changes to associations having to do with a key is kept in memory and merged with the longer-lived value list node 43 kept in permanent storage when the system is quiescent. When there is a lookup in such a system, both value list nodes typically are checked and their contents merged.

In certain embodiments, the entry node 42 can be accessed subsequently by submission of a value known to the entity asserting the association, while the value list node is an internal, derivative node that is used by management application 21 but is not directly accessible by any other entity. One potential benefit of this structure is to give users significant flexibility in defining associations while simultaneously maintaining greater control over the data values that are associated with corresponding keys. Another potential benefit, particularly in embodiments where security is an important concern, is to make it more difficult for individual entities to determine who (other than themselves) has been granted access to particular data values.

Referring back to FIG. 2, in order to coordinate the information between the various entry nodes 42 and the value list nodes 43, each entry node 42 preferably includes a reference 52 to each value list node 42 to which it corresponds (e.g., one for each key designated in the entry node 42), and each value list node 43 preferably includes a reference 53 to each entry node 42 storing an association that pertains to it (e.g., an association including the key that corresponds to such value list node 43).

References to the value list nodes 43 that are stored in the entry nodes 42 preferably are generated by using a unique hashing technique, one that is different from any other hashing technique used in the system. In one representative embodiment in which the MD-5 hash is used for other node references, the special hash used for referencing value list nodes 43 is computed by first-calculating a MD-5 hash of the key and then computing a bitwise complement or by performing a bitwise exclusive-or (XOR) operation using a defined bit string. In the preferred embodiment, the hashes generated by this unique hashing technique are recognizably different from other hashes, as is described below.

The association stored in the entry node 42 preferably includes the key, together with certain additional information. In the present embodiment, such additional information includes: (1) a data value (which, as noted previously, can include multiple different components or values) designated by the requester with which the key is to be associated, digests (e.g., hashes) of such data values and/or references to one or more other nodes that include the data value (such references potentially being hashes of the data values); (2) one or more optional override locks; (3) one or more optional override keys; (4) an optional set of access values and/or criteria (the word "optional" here meaning at the option of the requester, i.e., the entity asserting the association); and (5) in some cases, references to other entry nodes.

In this latter regard, in certain embodiments the entry nodes are stored in data structures. For example, in one preferred embodiment the entry nodes are stored in HDAGs (e.g., a single HDAG for all of the associations asserted by a particular entity or all of the associations asserted by a particular entity in a given session). In addition, such HDAGs or other data structures preferably are contained within retention groups (i.e., groups of associations that have common rules regarding when they are to expire).

Figure 4:
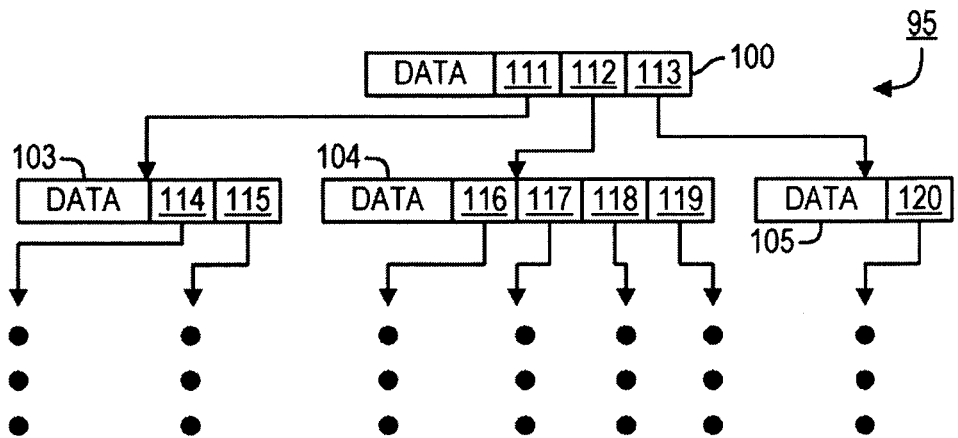
FIG. 4 illustrates a portion of a HDAG data structure.

Generally speaking, in a HDAG data structure a hierarchical arrangement of data is represented by a set of nodes in an acyclic graph. An example of a portion of a HDAG data structure 95 is shown in FIG. 4. In this example, all of the data are represented by a root node 100. Root node 100, in turn, has a number of child nodes, such as child nodes 103-105. Included within root node 100 is certain data (often, just metadata at this level) and a separate hash of at least some of the contents of each of its child nodes (e.g., hashes 111-113 of nodes 103-105, respectively), with each hash functioning as a reference to the corresponding child node.

Each such child node 103-105, in turn, includes a number of its own children, again with each such child represented within the subject node (e.g., one of nodes 103-105) by a hash of at least some of the child node's contents (e.g., hashes 114-120), with such hash also functioning as a reference to the child node. In practice, the hierarchical data structure can be large and include many levels. Typically, only the data fields in the leaf nodes contain content other than metadata.

In any event, in accordance with the general HDAG structure, higher-level nodes include one or more hashes, generated from content within their child nodes. Typically, each such hash is calculated across all of the content of the corresponding child node. However, in certain embodiments, the hash is only calculated across content within the corresponding child node that is deemed as relevant (e.g., content that one wishes to monitor). As a result of this structure, and assuming that each parent includes a hash for each child (or at least each relevant child) the system is able to determine whether an entire sub-structure of the hierarchy corresponding to the hash of its topmost node already has been stored (or, more generally, is otherwise present). On the other hand, if the entire sub-structure is not present, the system preferably drills down deeper into the hierarchy to check for matches at lower levels.

Figure 5:
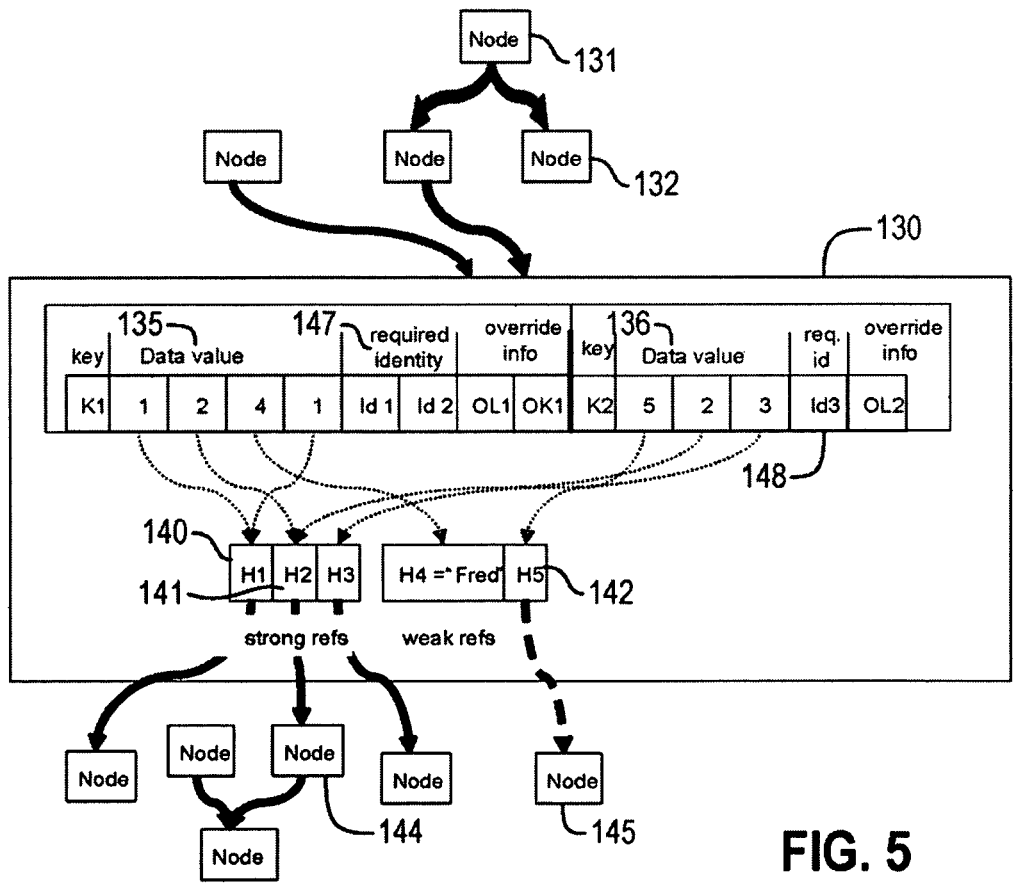
FIG. 5 illustrates an example of certain contents of an entry node within a HDAG data structure.

FIG. 5 illustrates an example of an entry node 130 within a HDAG data structure that includes other nodes, such as nodes 131 and 132 (which could be other entry nodes and/or other kinds of nodes). Included within entry node 130 are two keys, K1 and K2. Key K1 has a data value 135 associated with it, and key K2 has a data value 136 associated with it. As shown, data value 135 has four component values and data value 136 has three, each such component value including a reference into an internal table 140 of values. Some of the values in table 140 (e.g., values 141 and 142) are references (e.g., cryptographic hash references) to other nodes (e.g., nodes 144 and 145, respectively) that include the actual component values. Other instances of the values in table 140 are the actual component values themselves, which might typically be the case, e.g., for shorter component values and/or for those component values that are not expected to be referenced by other nodes in the system. For example, H4 in table 142 is the constant string "Fred". In some embodiments, the indirection through table 140 is not done and the references themselves are inserted directly.

In addition, each key-and-data-value association also includes: (1) any additional information that must be asserted in order to retrieve the data values (here represented as required identities 147 and 148, although in alternate embodiments such additional information can be of any conceivable kind, defined in any conceivable way) and (2) any specified override information. More particularly, the first key-value association in entry node 130 requires, in addition to submission of K1, that the requester prove possession of either identity credential Id1 or identity credential Id2 in order to obtain data value 135. Similarly, the second key-value association requires, in addition to submission of K2, that the requester prove possession of identity credential Id3 in order to obtain data value 136.

With respect to override information, the first association includes an override lock OL1, which means that the association can be overridden by another association that produces the matching override key, and also includes an override key OK1 which is used to override another stored association (e.g., an association having a lock value to which OK1 hashes). The second association just has an override lock OL2 which means it can be overridden by another association having the matching key but it does not attempt to override any other association. The preferred override technique is described in more detail below.

As indicated in the foregoing example, an entry node according to the present invention preferably can include multiple associations, potentially involving different keys and corresponding different data values of any conceivable type (e.g., metadata indicating similarity to another data object, a relationship to another data object, file annotation data, or the like). However, in the preferred embodiments each entry node is generated by a single entity, i.e., with different entities directly or indirectly generating their own sets of entry nodes.

In certain embodiments, the entry node preferably also contains an indication of which of the associations are considered to be "strong references" and which are considered to be "weak references". These concepts are useful in performing cleanup operations in which nodes that are no longer needed are deleted. In the preferred embodiments, a "strong reference" implies that as long as the entry node itself is in the data store, the node referenced by the association will not be deleted or designated for deletion; other associations preferably are "weak references" which do not imply that guarantee. Because different associations in an entry node preferably can make use of the same data values, in the present example the table 140 within entry node 130 includes two lists of data value references, i.e., one list of strong references (including value 141) and one list of weak references (including value 142), with the associations referring into such lists. In other embodiments, other indications of which references are strong and which are weak are employed.

As indicated above, any given association can include an override lock and/or an override key (or, for that matter, multiple override locks and/or keys). The override lock preferably gives the requirement for another association to override this association. The override key asserts that this association overrides another one (i.e., one with the matching lock). The override lock-and-key mechanism preferably is based on the Usenet Cancel-Lock mechanism, e.g., as described in the USEFOR Working Group INTERNET-DRAFT authored by Simon Lyall, dated November 1998, entitled "Cancel-Locks in Usenet," and identified by the identified articles.draft-ietf-usefor-cancel-lock-01.txt. Essentially, the principle behind the use of such a mechanism is that in order to guard against malicious removal, when an association is requested, a secret override key is generated. This override key preferably is hashed using a well-known function (e.g., SHA-1 or any other adequately secure hash function) to generate an override lock, which then is included with the association. Because it is presumed to be prohibitively difficult to reverse a cryptographic hash function, anyone who can actually produce the override key that fits (i.e., hashes to) the override lock can be presumed to be authorized to override the value. However, it should be noted that any other lock-and-key mechanism instead can be used.

In certain embodiments, the actual value of the override key is a hash of the association key, some private (or shared secret) information and, in certain cases, a serial number based on the sequence of overriding. However, using a serial number generally implies that the association needs to keep this information in the value and requires a lookup to find out what is being overridden. On the other hand, simply hashing the association key and a secret will always result in the same value, and the key will fit the association's own lock, which might not be desirable, e.g., in that it will be difficult to establish the appropriate sequence in which the overrides are to be applied. In certain embodiments one or more well-known override locks and keys exist for the purpose of allowing overriding of values by anyone. Such well-known values may be created in the same manner as normal override locks and keys or may simply be identifiable by their contents.

As noted above, when an entry node (e.g., entry node 130) is added to the data store 16 (i.e., it was not already there), the corresponding value list node(s) are found or created, and the information for the new association is added, flagged as not overridden. If the new association has an override key on it, that override key preferably is hashed to find the corresponding override lock, and any association with that override lock is flagged as being overridden (based on a model that if B overrides A and then C overrides B, A stays overridden, although an alternate embodiments the override is removed from A once B is overridden). If any such associations exist, the association being added is flagged as overriding. If the new association has an override lock, the data store 16 preferably checks whether that lock corresponds to the override keys for any of the other entries, and, if so, the new association is marked as (already) overridden.

In the example given above, in addition to the key value, an appropriate identity credential must be asserted to retrieve the corresponding data value. It should be noted that this is just one example of an access criterion. In alternate embodiments, a different access criterion (which can be just a simple condition or a multi-part criterion) and/or different values are used. Generally speaking, the access values and/or criterion allow the entity asserting the association to specify who should be allowed to see the association and/or retrieve the data value referenced by the association. The access criterion could take any of several forms, e.g.:

A public key (or other credential) for an identity that the requestor would have to assert and prove to the server 16, e.g., when a session is initiated. A benefit of this approach is that the identity proof could be delayed until the server 16 gave the client 12 a challenge in the form of a random number that had to be encrypted using a public key process by the client 12, although this variation would require both a public key encryption (by the client) and a public key decryption (by the server). The client 12 might or might not be required to disclose the resulting encryption value or might only be required to disclose the hash of the resulting encryption value.

A hash of a public key (or some other credential) possessed by the requester 12 that the requester 12 would have to assert and prove to the server 16 before making the request. This value is smaller, and the server 16 will not know the actual credential until somebody asserts it, but with this approach the proof generally cannot be delayed.

A challenge/response pair, e.g., of the form <r, H(Id;r)>, where r is a random number. Here, the server 16 sends back r, and the client 12 responds with hashes using all of its identities. This approach leaks the least information to the server 16, because the server 16 cannot correlate different associations exposed to the same identity and it is inexpensive for both sides to compute, but it generally requires a round trip each time, and it generally leaks information to the client 12 that there is a value there.

It is noted that the same association can be made visible to multiple identities. Alternatively, the access criterion can be eliminated entirely (i.e., the association is made public).

In certain embodiments, the data store 16 also includes "identity delegates", in which a client 12 who can prove an identity is allowed to specify other identities that are also allowed to see values that it is allowed to see. This approach can be used, e.g., as discussed in the "Key Management" application to allow an identity 12 to delegate its access rights to a trusted scanner or other automated entity. In such embodiments, proving the delegated identity preferably is treated as proving the original identity for access purposes, although not necessarily for the purpose of granting further delegation.

In the current embodiment of the invention, at the same time that an entry node 42 is created (in step 72 of FIG. 3), a corresponding value list node 43 is either created or supplemented. More preferably, the key for the association is stored in a new value list node 43 (if not previously stored in connection with a different entry node using the same key), together with the following information for the new association: (1) the data value; (2) the optional override lock; (2) the override lock corresponding to the optional override key (e.g., obtained by hashing the override key); (3) flags stating whether the data value is overridden, whether it overrides, and whether it has been deleted; and (4) the hash of (or other reference to) the entry node that led to the association. In other embodiments the override key is stored rather than the override lock corresponding to the override key.

In certain embodiments, the entry node 42 also contains strong references to the value list nodes 43 corresponding to the keys for each of the associations it contains. These references are computed by computing the hash of the keys using the special hashing algorithm described above. In other embodiments, as when the special hashing algorithm is not made public (and so these values cannot be computed outside of the data store 16) and the associations are created by storing entry nodes 42, the data store 16 augments the stored entry nodes 42 with these references. In such embodiments, the reference to an entry node 42 is computed on only the portion presented to the data store 16 (i.e., not including the augmentation) and when a request to retrieve the entry node 42 is received by the data store 16, the augmentations are preferably not included in the returned value.

Figure 6:
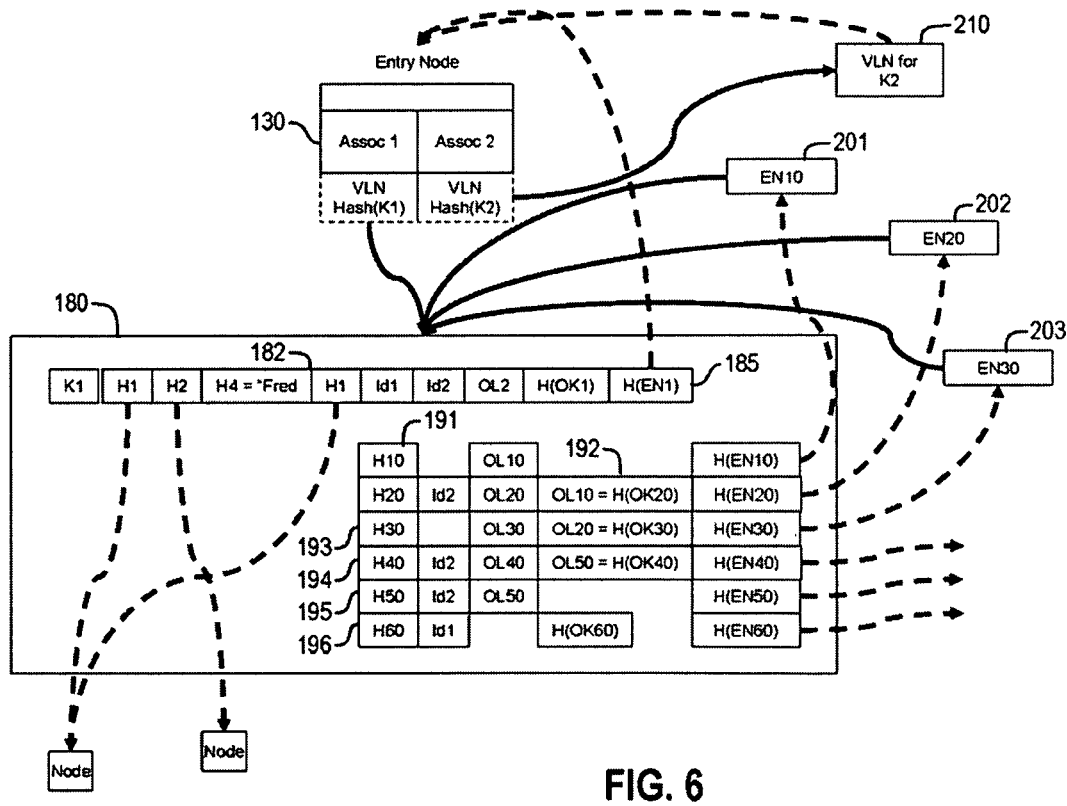
FIG. 6 illustrates an example of a value list node, as well as certain of its relationships to other nodes.

A more detailed depiction of a value list node 180 according to this embodiment of the invention, as well as the relationship between value list node 180 and entry node 130 (as well as various other related entry nodes), is illustrated in FIG. 6. As indicated in FIG. 6, value list node 180 pertains to the key for the first association in entry node 130 (which is shown in FIG. 6 as including a reference to value list node 180). That association is reflected in value list node 180 as entry 182. At the same time, additional associations 191-196 involving the same key (K1) also are stored in value list node 180.

As indicated, much of the information in the association 182 stored in value list node 180 mirrors the information in the corresponding entry node 130. One difference is that the hash of the override key (OK1) has been stored in value list node 180, rather than the override key value itself. As result, the appropriate overrides can be determined more quickly. In addition, association 182 includes a reference 185 back to the entry node 130 that caused association 182 to be stored in value list node 180; similarly, associations 191-196 include references back to the entry nodes (e.g., entry nodes 201-203) that caused them to be stored within value list node 180, and a different value list node 210 that corresponds to the second association in entry node 130 also refers back to entry node 130. These back references are weak references, which means that the entry nodes (130 and 201-203) and their children can be deleted even though the value list node 180 still exists.

Figure 7:
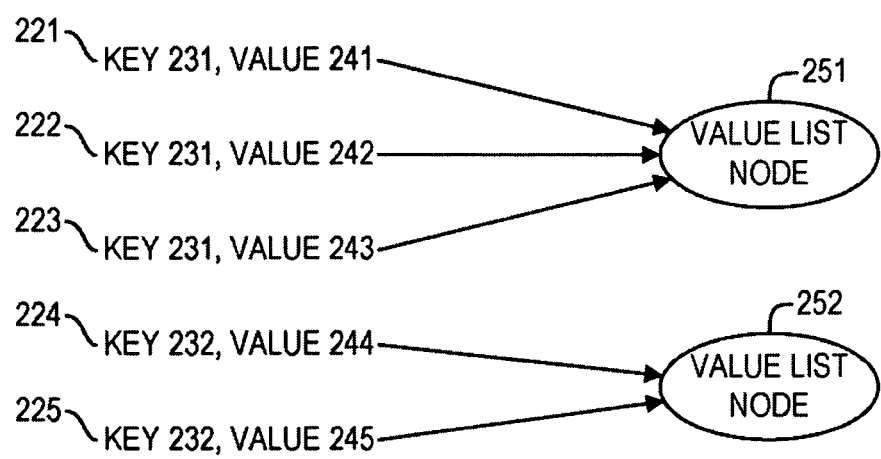
FIG. 7 is a block diagram showing the relationship between key-value associations and value list nodes according to a representative embodiment of the invention.

In the present embodiment, the value list nodes (such as node 180) are purely internal storage nodes whose contents are not directly accessible from outside the data store 16. They contain the data values currently associated with a particular key. That is, each value list node preferably represents (e.g., either stores or has access to) all current associations with a given key, even those that are overridden. Thus, as shown in FIG. 7, associations 221-223 reference the same value list node 251 because they have the same key value 231, although they have different data values 241-243, respectively; similarly, associations 224 and 225 reference the same value list node 252 because they have the same key value 232, although they have different data values 244 and 245, respectively.

Figure 8:
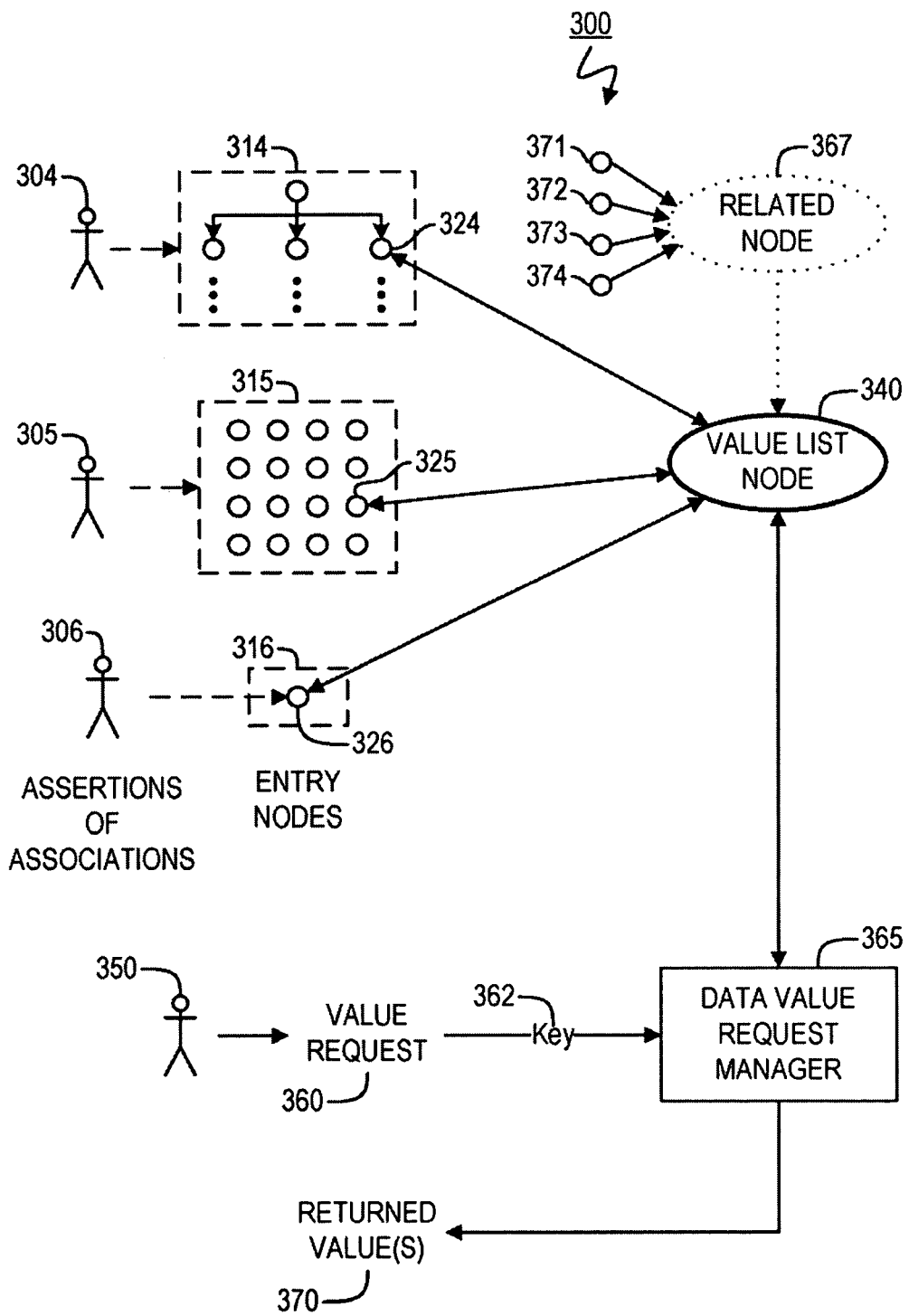
FIG. 8 is a conceptual block diagram providing an overview of the system according to representative embodiments and of the present invention.

An overview of a system 300 according to a representative embodiment of the present invention is illustrated in FIG. 8. As shown, a variety of different entities 304-306 (which, e.g., can be people and/or automated agents) specify or assert associations between keys and values. For example, entity 304 asserts a set of associations and causes them to be stored within an entry node HDAG data structure 314. Entity 305 creates a set 315 of associations without specifying any particular relationships between them. Entity 306 creates a single association 316. In each case, corresponding entry nodes automatically are generated to store the associations, and value list nodes are generated and/or modified to store the data values corresponding to individual keys. For example, each of entry nodes 324-326 references the same value list node 340 because each includes an association having the same key, even though each may have entirely different properties otherwise, as specified by their respective asserting entities 304-306.

The foregoing discussion primarily concerns the assertion of associations, as well as the preferred processing and storage techniques for reflecting such associations within data store 16. Another aspect of the present invention is the ability for users or other entities to request the data value associated with a specified key.

Thus, returning to FIG. 3, in step 77 a determination is made as to whether any data value request 360 (as shown in FIG. 8) has been made. Such a request 360 can be initiated directly by a user 12, but sometimes instead will be initiated indirectly by the user 12. For example, with respect to the example in which the data values comprise decryption keys for data objects within an encrypted file system, a user 12 operating her computer 14 to browse through files on server 16 (i.e., in this example, encrypted files within backup data store 16) will come across an encrypted file and attempt to open it or otherwise access it. In response, an application running on computer 14 automatically will create and transmit request 360, packaging into request 360 the appropriate information pertaining to the identity of user 12 and the identity of the subject file. As with requests to store associations, requests to retrieve associated values can be made in different ways in different embodiments. In some embodiments, the protocol for interacting with the data store 16 may include a special request of the form "Please retrieve values associated with key K". In other embodiments, a request to retrieve a value may take the form of a request to retrieve a chunk associated with a reference computed by applying the special value list node hashing algorithm to the key. In such embodiments, the data store 16 uses the format of the digest proffered in the request to determine that it is a request to retrieve an association value. Such a determination is based on the digest format described below. Generally speaking, the data value request preferably includes some function of the key corresponding to the data value, e.g., a hash of the key or simply the key itself (i.e., where the function is the identity function).

If a request 360 has been received in step 77, processing proceeds to step 78. If no request 360 has been received, processing proceeds to step 79.

In step 78, any data value (or portion thereof) that is relevant to the received request 360 is retrieved and/or generated on-the-fly and then provided to the requester 350. As indicated above, the request 360 preferably includes a key 362 that is derived from the data object to which the desired data values apply or, more generally, from an identification for the desired data value.

The value of the key 362 is then used to access the corresponding value list node 340. In the present embodiment, the requester is only allowed to access node 340 through a software component 365 (e.g., a component of data store 16) that manages incoming requests 360. As indicated above, in one specific embodiment, component 365 performs a special hash on the key 362 in order to obtain a reference to the corresponding value list node 340.

As further indicated in the above discussion regarding access values and/or criteria, in certain embodiments of the invention, the requester 350 must have provided certain access information, e.g., proving his or her identity, in order to obtain one or more of the data values within value list node 340. In one embodiment, the applicable criterion need only be satisfied for once for each session (which can include multiple requests 360).

The techniques by which data store 16 obtains the requested data value(s) differ according to the various embodiments of the present invention. In certain embodiments, the requested data value(s): (1) are generated on the fly based on the associations in the value list node 340, (2) are simply provided (in the event that such data value(s) previously have been generated based on the relevant associations in the value list node 340 and then stored within value list node 340), or (3) any combination of the two. In any case, the processing to determine the requested data value preferably takes account of all relevant currently active associations for the request key 362, as well as all effective overrides and all applicable access criteria.

In addition, the foregoing embodiments generally pertain to the simple case in which each data value is or comprises one or more component values which are constant values or constant references to (possibly changing) values. However, in alternate embodiments, at least some of the stored data values are defined by the requesters 304-306 to be functionally dependent on other values, which might be, e.g., constants, values associated with keys, or other values accessible to data store 16 and which might change over time. For example, a requester 304-306 might request an association to a value which is defined to be the maximum of all (or all visible) values associated with a specified other key or set of keys. As a second example, the association might be to the sum (or any other function) of values associated with a specified key or set of keys. As a third example, the association might be to the difference between the current time and the time a particular referenced chunk was stored in data store 16. In such embodiments, the request to create the association will contain sufficient information to allow the server 16 to identify both the arguments to the combination and the method of combining them.

The specification of such a combination could be as simple as a selection from a fixed list of available functions or as complicated as a program specified in a general-purpose programming language. In such alternate embodiments, the retrieval processing also determines the current component values of the parameters which will serve as arguments to the combining function and then computes the combination. In some of these embodiments, the values which are allowed to serve as arguments are restricted to values whose access criteria would allow the requesting user to retrieve them. In some embodiments, such restrictions are dependent upon the combining function that has been specified (e.g., certain functions asserted by certain individuals that return personally identifying data are prohibited while other functions asserted by the same individuals that only return aggregate data are permitted). In some embodiments, some combining functions can result in more than one component value being returned. For example, a combining function that specifies an association with the sum of the values with two keys, the first of which is (visibly) associated with two values and the second of which is (visibly) associated with three values, may result in up to six such sums, when the values are taken pairwise. In some such embodiments, a further indication can be specified in order to allow the combining function to "match up" desired pairs, as, for example, by including as part of the subsidiary values an indication of an entity that asserted the association.

Accordingly, in at least some of such alternate embodiments the retrieval processing also accesses information in one or more other related value list nodes 367 (e.g., having their own separately defined entry nodes 371-374). For example, in one embodiment, such processing looks up the data object corresponding to key 362, determines that it belongs to a larger group and therefore inherits certain data values from the group, and then accesses value list node 367 to obtain and include such group data values within the returned data value(s) 370. Similar group value list nodes can be used for groups to which the individual requester 350 belongs. In any event, the data value(s) 370 resulting from all such processing are then output to the requester.

Preferably, the returned data value(s) 370 are formatted as a specially typed chunk, including the key 362, followed in random (or otherwise different for different identical requests) order by a sequence of all non-overridden data value(s) (potentially with a descriptor field for each) for which the requester 350 has asserted an identity that allows it to see the value. For each one, preferably only the value is included, not the override key, override lock, or access digests. If two values are identical, preferably only one is returned.

Figure 9:
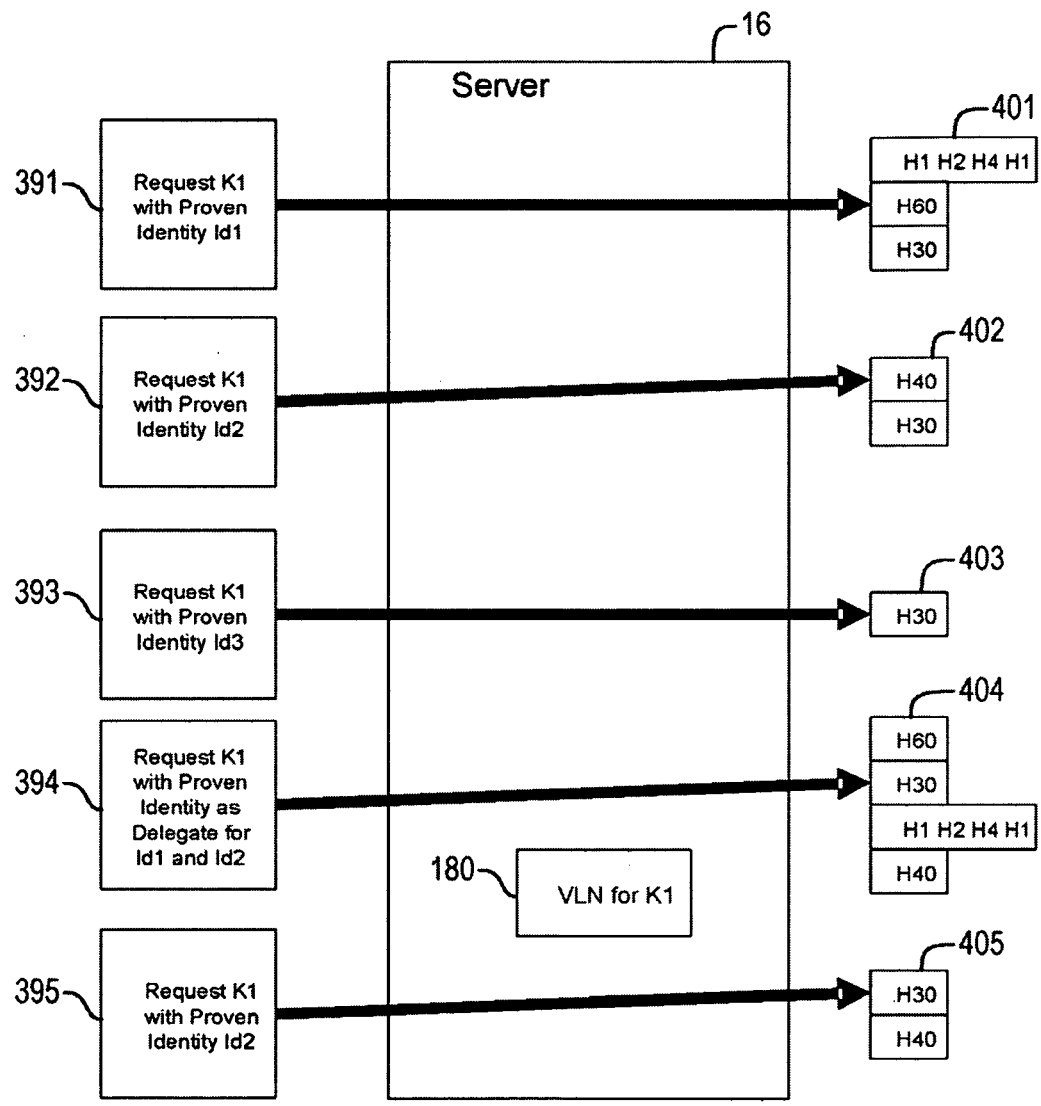
FIG. 9 is a block diagram illustrating examples of data-value requests and the returned data values.

FIG. 9 is a block diagram illustrating examples of data-value requests and the returned data values, in keeping with the same example described above. Each of the requests 391-395 involves key K1, corresponding to value list node 180 (shown in abbreviated form in FIG. 9 and in greater detail in FIG. 6). Request 391 asserts the identity Id1, so the returned data values 401 include only those data values which Id1 has permission to see. Similarly, request 392 asserts the identity Id2, so the returned data values 402 include only those data values which Id2 has permission to see; and request 393 asserts the identity Id3, so the returned data value 403 includes only the single data value which is visible for anyone to see. Request 394 is made by an entity which has been delegated rights to see everything that Id1 and Id2 are permitted to see, so the returned data values 404 include all the data values within value list node 180. Request 395 is a repeat of request 392, so in this case the returned data values 405 are the same as returned data values 402, but arranged in a different order. Note that some of the associations in value list node 180 (e.g., association 195) are overridden (in the case of association 195 by association 194) and therefore their values are not returned in response to any request.

More specifically, referring to FIG. 6, associations 191, 192, and 195 are overridden and associations 192 and 194 override (association 192 both overrides the association 191 and is overridden by association 193). In the present example, the associations in FIG. 6 are listed in the order in which they were asserted, i.e., with the associations at the top of the table having been asserted first. It is noted that association 194 overrides association 195, even though association 194 was asserted first, so association 195 was overridden at the moment it was asserted. However, if association 194 subsequently is deleted (or expires), association 195 will become active (i.e., will be restored). It is noted that for simplicity, the applicable override flags are not shown in the figures.

One aspect of the preferred embodiments of the present invention is the use of value list nodes, separate from association entry nodes, for storing all relevant information pertaining to a given potential request key. However, the actual structures used for accomplishing this purpose can differ from embodiment to embodiment. For example, in the embodiment discussed above, associations present in the entry nodes are essentially duplicated in the corresponding value list nodes. In alternate embodiments, the value list nodes just contain references to the entry nodes that include associations pertaining to the subject key, so that the appropriate data value(s) to be returned in response to a request 360 are generated (e.g., on-the-fly) by referencing the relevant entry nodes.

As will be readily apparent, the processing/storage configuration 300 can provide for a number of advantages pertaining to flexibility in defining, modifying and overriding associations between keys and data values, as well as advantages pertaining to maintaining the security of sensitive data values. Whether the value list nodes 340 maintain current data value(s) or generate them in real-time in response to a request 370 preferably depends on: the expected number of requests 360, the availability of system resources to constantly maintain current data values and the importance of providing fast responses to requests 360.

One important advantage of the preferred embodiments is the ability to have associations expire or otherwise be deleted, with the data values 370 returned in response to a request 360 being updated (e.g., on-the-fly) to reflect these changes. For example, as noted above, the individual requesters 304-306 preferably have the ability to search associations stored within retention groups. In this regard, anode preferably becomes part of a retention group simply by the fact of there being a strong reference to it from something in the retention group or by being designated a root node in a retention group. In any event, during periodic maintenance operations the associations represented in the various value list nodes are updated to reflect any changes that have occurred. For example, the expiration of a particular association might: (1) have no effect (if the association is overridden anyway), (2) result in the corresponding data value not being returned in response to a request 360 (if the association previously was active) and/or (3) cause some other data value to be returned in response to a request 360 (one whose association previously was overridden by the now expired association). In any event, in the preferred embodiments: (1) value list nodes are not deleted (or designated for deletion) while there are active entry nodes that refer to them, and (2) strong references from entry nodes prevent parts of the association value from being designated for deletion.

Preferably, data store 16 repeatedly over time (e.g., periodically) determines whether entry nodes have been deleted, and then deletes corresponding associations in the value list nodes corresponding to that deleted entry nodes and restores associations previously overridden by the associations in the deleted entry nodes. Such determinations can be made, e.g., for a particular entry noted in response to an explicit request to delete such entry node (e.g., an externally input request or an automated request based on a pre-specified expiration policy or a reclamation of the entry node (or the page containing the entry node) as "garbage") and/or can be made as part of a scanning process that is independent of any particular entry node.

In the preferred embodiments, the data store 16 also periodically (or in any other repeated manner over time) performs a scan of value list nodes, checking to see whether an entry node might have disappeared without the store 16 having a chance to process it (e.g., because it became corrupted or was deleted rather than being scavenged by the garbage collector). If the entry node no longer exists, the association preferably is removed. To facilitate such scanning, the value list nodes preferably are kept on special pages, i.e., designated portions of the store 16, as described in the '092 application.

When a page of entry nodes is scavenged, each one preferably is processed by finding the corresponding value list nodes and removing from them data value information corresponding to the entry node reference. Several specific cases are as follows.

When the association is both overridden and overriding, everything but the override lock and override key's lock preferably is removed (although in alternate embodiments it is not worthwhile to do so, in light of the fact that the value references preferably are weak references, so it will not matter to garbage collection), and the resulting abbreviated entry preferably is flagged as being deleted. This approach ensures that chains of overriding associations remain intact even if intermediate associations vanish.

Otherwise, the association preferably is removed, possibly with some cleanup. For example, if the association overrides and there are no other associations with the same override key, then there is a chain of zero or more deleted associations terminating in an overridden association. The deleted associations (if any) preferably are removed and the previously overridden association are flagged as no longer being overridden (i.e., are restored). If, on the other hand, the association being removed is overridden and there are no other associations with the same override lock, the associations with keys matching its lock preferably are flagged as no longer overriding. If these associations are flagged as deleted, they also preferably are removed, and so on, recursively.

In most cases, it is expected that there will be a single association for a key, so this cleanup operation will be trivial. In any event, however, the cleanup operation preferably is entirely internal to the store 16, so the mechanism can change without disrupting anything externally visible.

It is noted that when a new entry node is created, value list nodes typically are retrieved, modified and stored again. This process could be quite expensive, so in certain embodiments those associations that have not yet made it out to pages are kept in memory (preferably journaled to disk so that they can be brought back should the process die), and these new associations are merged in real time should the value be requested. In such embodiments, the actual modifications preferably take place in the background when the store 16 is relatively quiescent. Additional details regarding some of the foregoing concepts are described in the '092 application.

Self-Describing Digest Abstraction

There are several cryptographic hash algorithms in use and more are being developed. In addition, as discussed above, it sometimes is desirable to use modifications of existing hash algorithms.

With respect to the embodiments described above, for the most part, the data store 16 does not actually interpret the digests produced (except, e.g., where the values are constants or map keys, or when optional consistency checking is performed), but it does read them and store them as opaque strings of bytes. Unfortunately, different hash algorithms produce digests of different lengths, which can make it difficult to deal with digests produced by hash algorithms with which the recipient is unfamiliar.

Figure 10:
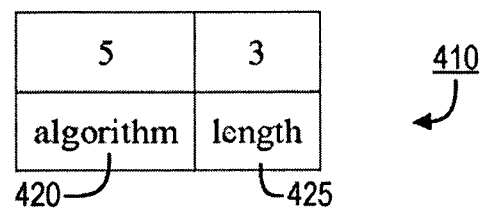
FIG. 10 illustrates the structure of an exemplary self-describing digest abstraction scheme descriptor.

This section discusses various self-describing digest abstractions that can accommodate flexibly defined hashes (or digests). Generally speaking, such abstractions include separate fields for type and length of the hash and the use "indirection" codes to allow for expandability. More preferably, as shown in FIG. 10, the abstraction is provided as a single-byte descriptor 410 that is divided into two parts: an algorithm type field 420 (preferably 5 bits long) indicating the type of hash performed and a length field 425 (preferably 3 bits long) indicating the length of the resulting hash value.

Figure 11:
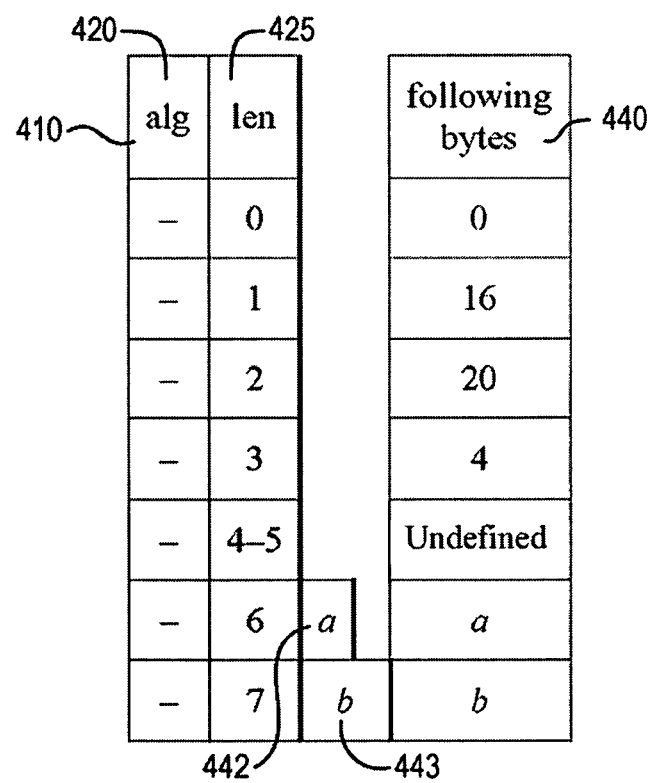
FIG. 11 illustrates the meanings of different values for the length field of a scheme descriptor according to a representative embodiment of the invention.

As a result of this structure, it is possible to encode eight different lengths (including null). In many situations, that number will be insufficient, so some codes for the length field 425 preferably indicate that the actual length will be specified by the one or two bytes that follow the scheme byte 410. An example is shown in FIG. 11 which shows the meanings for different codes in the length field 425 in a particular embodiment, including the corresponding length of the hash value 440, as well as whether the length code 425 indicates the presence of an indirection field 442 or 443. Codes within the length field 425 of 0-5 correspond to the indicated fixed lengths for the hash value. Specifically, a length code of 0 corresponds to a length of 0 (null), a length code of 1 corresponds to a length of 16 bytes (e.g., for MD5), and a length code of 2 corresponds to a length of 20 bytes (e.g., for SHA-1). A standard length of 4 bytes (when the length code is 3) is provided in order to allow constant numbers to be used in some places in which digests are required.

The other two standard sizes (when the length code is 4 or 5) preferably are selected based on the considerations applicable to the particular embodiment, e.g., using hash sizes from other common algorithms. For example, any two of the values 32, 64 and 128 bytes might be selected.

When the length field 425 has a code of 6, the actual length is taken as an unsigned value from the following byte 442. When its code is 7, the length is taken as an unsigned value from the following two bytes 443.

It is noted that the foregoing allocations are merely exemplary. In addition, in alternate embodiments the scheme descriptor 410 can have a different size or, even if implemented as a single byte, the individual bits might be allocated differently, such as by having both the type field 420 and the length field 425 be 4 bits long, or by having the length field 425 be longer (e.g., 5 bits) than the type field 420 (e.g., 3 bits). In still further alternate embodiments, the division of the descriptor 410 into separate fields may be performed algorithmically. For instance, the length field 425 may be computed as the result of computing the modulus of the descriptor 410 with respect to a well-known predefined constant while the algorithm field 420 may be the integer portion of the result of dividing the descriptor 410 by that value. It should be noted that such an algorithm is purely exemplary. In any event, it is generally preferred that, given a digest containing a descriptor (and optional following indirection bytes), it is possible based on that information: (1) to determine the length of the following data bytes even when the descriptor indicates an algorithm unknown to the one doing the interpretation and (2) to distinguish two digests computed using different algorithms when the following data bytes are identical.

An exemplary assignment of codes for the algorithm type field 420 is shown in FIG. 12, which includes in addition to the code in the type field 420, ranges of codes in the indirection field 442 (if applicable), the total number of different algorithms available within the indicated range 445, and the general categorization 447 of the corresponding hash types. As shown in FIG. 12, in the algorithm field 420, regardless of length, a code of 29 (0x1D) preferably indicates a constant string (or number) rather than the result of some hash function. This allocation allows digests to be used uniformly in places in which some values are references to nodes and others are simply constants or strings. The rest of the codes preferably are divided between those actually registered, those that the data store 16 can use internally, and those that are left unspecified but can be used as private schemes (recognizing that private schemes might collide and so should not be used in some situations).

Similar to the length field 425, the algorithm type field 420 preferably includes one or more indirection codes. In the present embodiment, as shown in FIG. 12, a code of 30 (0x1E) indicates that the actual scheme comes from the following byte, and a code of 31 (0x1F) indicates that the actual scheme comes from the following two bytes. If both the length field 425 and the algorithm field 420 include indirection codes, the length field 425 preferably comes first.

In certain embodiments, some of the top of the internal space is explicitly reserved for both one- and two-byte indirections in case it becomes desirable to extend farther. Also, in certain embodiments, for the two-byte algorithms, at least, the actual codes to be used are based on some hash function or random draw rather than being sequential based on some assigning body. Such an approach should help to minimize collisions in different domains.

It is noted that the algorithm field 420 can have different interpretations based on different length values. At least some codes, however, especially among the one- and two-byte ones, preferably are length-independent, so it should be possible to register them over all lengths as well.

A sample set of initial assignments is shown in FIG. 13, with scheme code 420 (indicating the value of all 8 bits), algorithm code 422 (indicating the value of the first 5 bits) length code 425 (indicating the value of the last 3 bits), length value (in bytes) 440 and algorithm descriptor 460 indicated. For the map key hash 462 mentioned above, even though the different scheme byte will mean that such a digest will not be considered equal to an MD5 hash over the same data, it is preferred to have it be less likely to collide in the index, so it currently is preferred to have the map key hash 462 be defined as the bitwise inverse of a MD5 hash. That is, as noted above, it can be computed by first computing the MD5 hash and then XORing each of the bytes with 0xFF.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of managing associations between keys and values within a computer processing system, comprising:
   inputting requests to store associations between keys and data values corresponding to the keys;
   storing the associations in entry nodes within a data structure represented as a hash-based directed acyclic graph (HDAG); and
   upon receipt of a data value request that includes a specified function of a request key, together with satisfaction of any additional access criterion, automatically providing a return data value corresponding to the request key, wherein the return data value has been generated based on at least one of the associations that involve the request key,
   wherein the data values are managed in value list nodes and references to the value list nodes are generated using a hashing algorithm that is different than one or more hashing algorithms used to generate the HDAG.

2. A method according to claim 1, wherein the value list nodes correspond to individual ones of the keys, and the data values corresponding to a given key are managed in a single value list node.

3. A method according to claim 2, further comprising a step of:
   storing references between (1) the entry nodes storing associations involving a particular key and (2) the value list node corresponding to said particular key.

4. A method according to claim 3, further comprising a step of:
   determining whether an entry node storing an association involving the particular key has been deleted and, if so, at least one of (1) deleting a corresponding association in the value list node corresponding to said particular key and (2) restoring an association previously overridden by the association involving the particular key in the deleted entry node.

5. A method according to claim 3, wherein the references between the entry nodes and the value list nodes are stored within the entry nodes, and wherein said method further comprises a step, executed upon receipt of a request to retrieve a chunk corresponding to a reference to a specified entry node, of excluding the references between the specified entry node and the value list nodes in a returned result.

6. A method according to claim 2, wherein the data value request comprises a request to retrieve a reference to the value list node corresponding to the request key.

7. A method according to claim 1, wherein at least one hashing algorithm used is identified by a digest abstraction having a first field indicating a type of hash and a separate second field indicating a length of bytes comprising resulting hash code.

8. A method according to claim 1, wherein a plurality of the associations include override information, and the return data value provided in response to the data value request excludes overridden data values.

9. A method according to claim 1, wherein a specified request to store a set of at least one association comprises a request to store a chunk containing contents of a corresponding entry node.

10. A method according to claim 1, wherein at least one of the associations comprises a reference to a HDAG node, and wherein the HDAG node is protected from deletion at least until the entry node storing said at least one of the associations is deleted.

11. A method according to claim 1, wherein at least one of the entry nodes is associated with a retention group which is associated with an expiration criterion, and wherein said at least one of the entry nodes is protected from deletion at least until the expiration criterion is satisfied.

12. A method of managing associations between keys and values within a computer processing system, comprising:
   inputting requests to store associations between keys and data values corresponding to the keys;
   storing the associations in entry nodes of a hash-based directed acyclic graphic (HDAG); and
   upon receipt of a data value request that includes a specified function of a request key, together with satisfaction of any additional access criterion, automatically providing a return data value corresponding to the request key,
   wherein the return data value is generated based on a plurality of the associations involving the request key that were previously stored,
   wherein the data values are managed in value list nodes and references to the value list nodes are generated using a hashing algorithm that is different than one or more hashing algorithms used to generate the HDAG.

13. A method according to claim 12, wherein the requests to store associations are made by different entities and the associations used to generate the return data value resulted from requests made by a plurality of said different entities.

14. A method according to claim 12, wherein a plurality of the associations include override information, and the return data value provided in response to the data value request excludes overridden data values.

15. A method according to claim 14, wherein the override information for a first association includes an override lock for which a matching key must be provided in order to override said first association, and the override information for a second association includes an override key that provides the matching key, whereby the second association overrides the first association, resulting in an overridden data value.

16. A method according to claim 12, wherein the request key is associated, through a plurality of previously stored associations, with a plurality of data values having different access criteria, and wherein any data values for which the corresponding access criteria have not been satisfied are excluded from the return data value.

17. A method according to claim 16, wherein at least one of the access criteria comprises a required demonstration of at least one of an identity, a role and a capability of an entity submitting the data value request.

18. A method according to claim 16, wherein the return data value includes a plurality of component values, and wherein an order in which the component values are returned is different in response to different submissions of the data value request.

19. A non-transitory computer readable medium storing computer-executable process steps for managing associations between keys and values within a computer processing system, said process steps comprising:
   inputting requests to store associations between keys and data values corresponding to the keys;
   storing the associations in entry nodes within a data structure represented as a hash-based directed acyclic graph (HDAG); and
   upon receipt of a data value request that includes a specified function of a request key, together with satisfaction of any additional access criterion, automatically providing a return data value corresponding to the request key, wherein the return data value has been generated based on at least one of the associations that involve the request key,
   wherein the data values are managed in value list nodes and references to the value list nodes are generated using a hashing algorithm that is different than one or more hashing algorithms used to generate the HDAG.

* * * * *